United States Patent
He et al.

(10) Patent No.: US 9,805,243 B2
(45) Date of Patent: Oct. 31, 2017

(54) FINGERPRINT IDENTIFICATION SYSTEM, A DRIVING CIRCUIT AND A FINGERPRINT IDENTIFICATION METHOD

(71) Applicant: HIMAX TECHNOLOGIES LIMITED, Tainan (TW)

(72) Inventors: Jia-Ming He, Tainan (TW); Yaw-Guang Chang, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 15/066,860

(22) Filed: Mar. 10, 2016

(65) Prior Publication Data
US 2017/0262682 A1    Sep. 14, 2017

(51) Int. Cl.
  *G06K 9/00*   (2006.01)
  *G06T 5/00*   (2006.01)
  *G06F 21/32*  (2013.01)
  *G06K 19/073* (2006.01)
  *G06K 19/07*  (2006.01)
  (Continued)

(52) U.S. Cl.
  CPC ........... *G06K 9/0002* (2013.01); *G06F 21/32* (2013.01); *G06K 7/10891* (2013.01); *G06K 9/00087* (2013.01); *G06K 19/07* (2013.01); *G06K 19/07354* (2013.01); *G06T 5/002* (2013.01); *G06F 3/044* (2013.01); *G06K 9/00013* (2013.01)

(58) Field of Classification Search
  CPC .. G06K 9/0002; G06K 9/00087; G06K 9/001; G06K 9/0006; G06K 9/0008; G06K 9/00013; G06K 19/07; G06K 19/07354; G06K 7/10891; G06F 4/0416; G06F 21/32; G06F 3/004; G06F 3/044
  USPC ......................................................... 382/124
  See application file for complete search history.

(56) References Cited

U.S. PATENT DOCUMENTS

2005/0122119 A1   6/2005  Barlow
2007/0031011 A1   2/2007  Erhart et al.
(Continued)

FOREIGN PATENT DOCUMENTS

TW   201232423   8/2012
TW   M498326     4/2015

OTHER PUBLICATIONS

"Office Action of Taiwan Counterpart Application", dated Oct. 24, 2016, p. 1-p. 7.
(Continued)

*Primary Examiner* — Kanjibhai Patel
(74) *Attorney, Agent, or Firm* — J.C. Patents

(57) ABSTRACT

A fingerprint identification system is provided. The fingerprint identification system includes a sensing panel and a driving circuit. The sensing panel includes a plurality of sensors. Each of the sensors transmits a sensing signal and a reference signal through two signal transmission paths. The driving circuit is coupled to the sensing panel. The driving circuit is configured to drive the sensing panel, and execute a fingerprint identification operation according to the sensing signal and the reference signal. The sensing signal and the reference signal form a differential signal pair. The driving circuit generates a fingerprint identification signal according to the sensing signal and the reference signal. A driving circuit and a fingerprint identification method are also provided.

17 Claims, 5 Drawing Sheets

(51) Int. Cl.
*G06K 7/10* (2006.01)
*G06F 3/044* (2006.01)

(56) References Cited

U.S. PATENT DOCUMENTS

| | | | |
|---|---|---|---|
| 2010/0284489 A1 | 11/2010 | Bae et al. | |
| 2016/0291765 A1* | 10/2016 | Shen | G06F 3/0416 |
| 2016/0291766 A1* | 10/2016 | Shen | G06F 3/0416 |
| 2016/0307021 A1* | 10/2016 | Kim | G06K 9/0002 |
| 2017/0006223 A1* | 1/2017 | Hargreaves | H04N 5/23241 |

OTHER PUBLICATIONS

"Office Action of Taiwan Counterpart Application," dated Mar. 30, 2017, p. 1-p. 8.

* cited by examiner

FINGERPRINT IDENTIFICATION SYSTEM, A DRIVING CIRCUIT AND A FINGERPRINT IDENTIFICATION METHOD

BACKGROUND OF THE INVENTION

1. Field of the Invention

The invention relates to a fingerprint identification technique, and specially regards a fingerprint identification system, a driving circuit, and a fingerprint identification method.

2. Description of Related Art

In the fields of fingerprint identification, fingerprint identification techniques are categorized into optical, thermosensitive, ultrasonic, and capacitive techniques. These fingerprint identification techniques have different application and combinations in current different electronic devices. Specially, the capacitive fingerprint identification technique has widespread applications now, and the fingerprint identification method focuses on the identification of the ridge-valley patterns of fingerprints to obtain fingerprint information. Due to the different ridge-valley patterns on fingerprints, when fingerprints contact the sensing panel, the capacitance of different sensing regions on the sensing panel may change in respect to different patterns. The sensing capacitance is smaller in the valley portion of the fingerprints and the ridge portion of the fingerprints has larger sensing capacitance. However, the ridge-valley difference of the pattern is minute, corresponding to a difference of sensing capacitance of only 0.1 farad to 1 farad on the sensing panel. Therefore, when conducting the fingerprint identification in the presence of noise interference, the fingerprint identification system may be influenced easily by the noise as the system receives the sensing signal regarding the changes in capacitance to analyse the changes in capacitance. The accuracy of the fingerprint identification may be influenced by the misjudgement of the signal. Thus, it is a very important issue to overcome noise interference to increase the accuracy of fingerprint identification.

SUMMARY OF THE INVENTION

Accordingly, the invention is directed to a fingerprint identification system, a driving circuit, and a method of fingerprint identification, capable of effectively resolving the noise interference of the signal on signal transmission paths.

The invention provides a fingerprint identification system including a sensing panel and a driving circuit. The sensing panel includes a plurality of sensors. Each of the sensors transmits a sensing signal and a reference signal through two signal transmission paths. The driving circuit is coupled to the sensing panel. The driving circuit is configured to drive the sensing panel, and execute a fingerprint identification operation according to the sensing signal and the reference signal. The sensing signal and the reference signal form a differential signal pair. The driving circuit generates a fingerprint identification signal according to the sensing signal and the reference signal.

In an embodiment of the invention, the sensors are respectively connected to the two signal transmission paths via two switch components. The two switch components are configured to execute an identical switching operation. The sensors respectively correspond to a plurality of sensing regions of the sensing panel. Each of the sensors determines whether to transmit a capacitance of the corresponding sensing region via one of the two switch components.

In an embodiment of the invention, the two signal transmission paths are arranged in a symmetric configuration to have an equivalent load.

In an embodiment of the invention, the sensing signal is determined according to the capacitance and a parasitic capacitance of one of the two signal transmission paths.

In an embodiment of the invention, the reference signal is determined according to a parasitic capacitance of the other one of the two signal transmission paths.

In an embodiment of the invention, the driving circuit includes a signal processing circuit. The signal processing circuit is configured to receive the sensing signal and the reference signal, and perform a differential operation to obtain the fingerprint identification signal according to the sensing signal and the reference signal.

In an embodiment of the invention, the signal processing circuit comprises a differential amplifier circuit.

In an embodiment of the invention, the driving circuit further includes a voltage supplying circuit. The voltage supplying circuit is coupled to the two signal transmission paths through two resistors, and configured provides the same bias voltage to the two signal transmission paths to drive the sensing panel.

The invention provides a driving circuit adapted to drive a sensing panel. The sensing panel includes a plurality of sensors and two signal transmission paths. The driving circuit includes a signal processing circuit. The signal processing circuit is coupled to the sensing panel. The signal processing circuit is configured to respectively receive a sensing signal and a reference signal through the two signal transmission paths, and execute a fingerprint identification operation according to the sensing signal and the reference signal. The sensing signal and the reference signal form a differential signal pair. The driving circuit generates a fingerprint identification signal according to the sensing signal and the reference signal.

In an embodiment of the invention, the sensors are respectively connected to the two signal transmission paths via two switch components. The two switch components are configured to execute an identical switching operation. The sensors correspond to a plurality of sensing regions of the sensing panel, and each of the sensors determines whether to transmit a capacitance of the corresponding sensing region via one of the two switch components.

In an embodiment of the invention, the two signal transmission paths are arranged in a symmetric configuration to have an equivalent load.

In an embodiment of the invention, the sensing signal is determined according to the capacitance and a parasitic capacitance of one of the two signal transmission paths.

In an embodiment of the invention, the reference signal is determined according to a parasitic capacitance of the other one of the two signal transmission paths.

In an embodiment of the invention, the signal processing circuit includes a differential amplifier circuit. The differential amplifier circuit is configured to receive the sensing signal and the reference signal, and perform a differential operation to obtain fingerprint identification signal according to the sensing signal and the reference signal.

In an embodiment of the invention, the driving circuit further includes a voltage supplying circuit. The voltage supplying circuit is coupled to the two signal transmission paths through two resistors. The voltage supplying circuit is configured provides the same bias voltage to the two signal transmission paths to drive the sensing panel.

The invention provides a fingerprint identification method adapted to a sensing panel. The sensing panel includes a plurality of sensors and two signal transmission paths. The fingerprint identification includes: respectively transmitting a sensing signal and a reference signal by using the two signal transmission paths; and executing a fingerprint identification operation according to the sensing signal and the reference signal to generate a fingerprint identification signal. The sensing signal and the reference signal form a differential signal pair.

In an embodiment of the invention, the sensors respectively correspond to a plurality of sensing regions of the sensing panel. Each of the sensors is configured to sense a capacitance of the corresponding sensing region. The sensing signal is determined according to the capacitance and a parasitic capacitance of one of the two signal transmission paths.

In an embodiment of the invention, the reference signal is determined according to a parasitic capacitance of the other one of the two signal transmission paths.

In an embodiment of the invention, the step of executing the fingerprint identification operation according to the sensing signal and the reference signal to generate the fingerprint identification signal includes: performing a differential operation to obtain the fingerprint identification signal according to the sensing signal and the reference signal.

Based on the above, the two signal transmission paths are arranged in the sensing panel for transmitting the sensing signal and the reference signal forming the differential signal pair to the driving circuit in the fingerprint identification system. The driving circuit reduces the noise interference within the sensing signal by using the reference signal, so as to effectively resolve the noise interference of the signal on the signal transmission paths.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Figure 1:
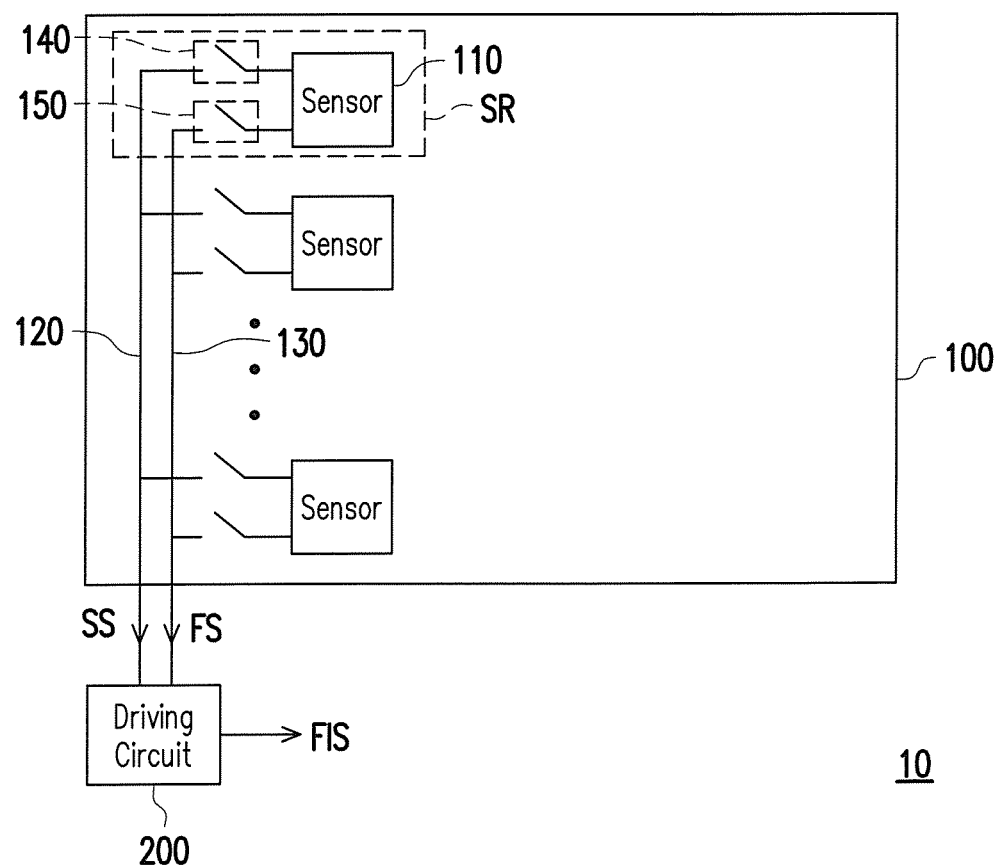
FIG. 1 is a schematic view of the fingerprint identification system according to an embodiment of the invention.

The term "coupling/coupled" used in this specification (including claims) may refer to any direct or indirect connection means. For instance, in the description and claims, if a first apparatus is coupled to a second apparatus, it means that the first apparatus may be directly connected to the second apparatus or may be indirectly connected to the second apparatus through another apparatus or by another connection means. In addition, the term "signal" may stand for at least one current, voltage, electric charge, temperature, data, electromagnetic wave, or any other signal or signals. Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic view of the fingerprint identification system according to an embodiment of the invention. Referring to FIG. 1, the fingerprint identification system 10 of the present embodiment includes the sensing panel 100 and the driving circuit 200. The sensing panel 100 includes a plurality of sensors 110. The sensors 110 corresponds to a plurality of sensing region SR of the sensing panel 100. The sensors 110 senses the capacitance of the sensing regions SR in a manner of one-to-one. Each of the sensors 110 respectively transmits the sensing signal SS and the reference signal FS through two signal transmission paths 120 and 130.

In the present embodiment, the sensing panel 100 further includes a plurality of switch components and the two signal transmission paths 120 and 130. Each of the sensors 110 is connected to the two transmission paths 120 and 130 through two switch components 140 and 150. The switch components 140 and 150 are configured to perform the same switch operation. Each of the sensors 110 determines whether to transmit the sensed capacitance through the switch component 140.

In the present embodiment, the driving circuit 200 is coupled to the sensing panel 100. The driving circuit 200 is configured to drive the sensing panel 100, and execute a fingerprint identification according to a sensing signal SS and a reference signal FS. The sensing signal SS and the reference signal FS form a differential signal pair. The driving circuit 200 generates a fingerprint identification signal FIS according to the sensing signal SS and the reference signal FS. The driving circuit 200 may further output the fingerprint identification signal FIS to the circuit of next-stage (not illustrated in figure) of the driving circuit 200 to execute the fingerprint identification for the next phase, but the invention is not limited thereto.

In the present embodiment, the sensors 110 may be capacitive sensors, and the sensing panel 100 may be a capacitive fingerprint identification panel, or may also incorporating a touch panel, a display panel, or a touch display panel, to have the fingerprint identification operation, and other touch and display functions simultaneously, but the invention is not limited thereto. In addition, the switch components 140 and 150 may be transmission gates, transistor switches, or other switch components/circuits.

It should be noted that, in the present embodiment, the signal transmission path 130 is not substantially coupled to the sensor 110, and thus the reference signal FS of the signal transmission path 130 does not include the capacitance of sensing region SR. In addition, in the present embodiment, the circuit configuration of the sensors 110 and the region size of the sensing regions SR of the present embodiment are not restricted as shown in FIG. 1. FIG. 1 simply demonstrates a summary of configurative relationships, and its purpose is to illustrate the coupling relationships between the sensing regions SR and the signal transmission paths 120 and 130. The signal transmission path 120 is coupled to the sensors 110 to receive the changes in capacitance of the sensing regions SR, which are sensed by the sensors 110. In contrast, the signal transmission path 130 is not coupled to the sensors 110. The signal transmission path 130 is configured to transmit the reference signal FS, and the reference signal FS corresponds to the noise waveform in the sensing signal SS.

Specifically, when the user places its finger on the sensing panel 100 for a fingerprint identification operation, since the plurality of sensing regions SR of the sensing panel 100 respectively correspond to different fingerprint patterns, the sensors 110 may respectively sense different capacitance. Each of the sensors 110 may transmit the sensed capacitance to the drive circuit 200 in a manner of time division via the signal transmission path 120 respectively through the switch components 140, so as to execute the fingerprint identification operation by using the drive circuit 200. However, when the drive circuit 200 receives the capacitance sensed by the sensors 110 through the signal transmission path 120, the driving circuit 200 may further receive the noise included in the signal transmission path 120 due to the parasitic capacitance or generated from the capacitance provided by other switch components, and may be even affected by the noise interference derived from other circuit configuration. That is, the sensing signal SS may be determined according to the sensed capacitance from each of the sensors 110 and the parasitic capacitance in the signal transmission path 120. Thus, the sensing signal SS received by the driving circuit 200 has the changes in capacitance received by the sensors 110, and also includes the noise provided by the parasitic capacitance in the signal transmission path 120.

In the present embodiment, the driving circuit 200 receives the reference signal FS through the signal transmission path 130. The signal transmission path 130 may form a symmetric configuration with the signal transmission path 120 to have the same equivalent load. The switch component 150 and the switch component 140 of each of the sensors 110 may also be arranged in a symmetric configuration, and have the same switching operation. Accordingly, the signal transmission path 130 and the signal transmission path 120 may have the same parasitic capacitance effect, in order to generate the same noise interference. That is, the reference signal FS may be determined according to the parasitic capacitance of the signal transmission path 130. Thus, the reference signal FS received by the driving circuit 200 may be the noise provided by the parasitic capacitance of the signal transmission path 130.

It should be noted that, in the present embodiment, since the signal transmission path 120 and the signal transmission path 130 form a symmetric configuration, the circuits of the signal transmission paths 120 and 130 have the same circuit structure and electronic device layout, e.g., having the same quantity of switches, and the signal transmission paths 120 and 130 are in a symmetric configuration that the switch component 140 and the corresponding switch 150 execute the same switching operation. In the present embodiment, the difference between the signal transmission paths 120 and 130 lies in that the signal transmission 120 transmits the sensed capacitance from the sensors 110 through switching actions of the plurality of switches 140. Although the signal transmission path 130 is coupled to the plurality of switches 150 that are symmetrically arranged with the switches 140, the switches 150 do not transmit the capacitance sensed by the sensors 110. One ends of the switches 150 is coupled to the signal transmitting path 130, and the other ends may be grounded, floating or coupled to a specific voltage level, and the invention is not limited thereto. That is, the sensing signal SS and the reference signal FS have the same noise interference signal, but the sensing signal SS further includes the changes in capacitance of the sensors 110. Thus, through the differential signal pair formed by the sensing signal SS and the reference signal FS, the driving circuit 200 may receive the sensing signal SS and the reference signal FS to perform a differential operation to reduce the noise interference in the sensing signal SS, and obtain the fingerprint identification signal FIS.

Figure 2A:
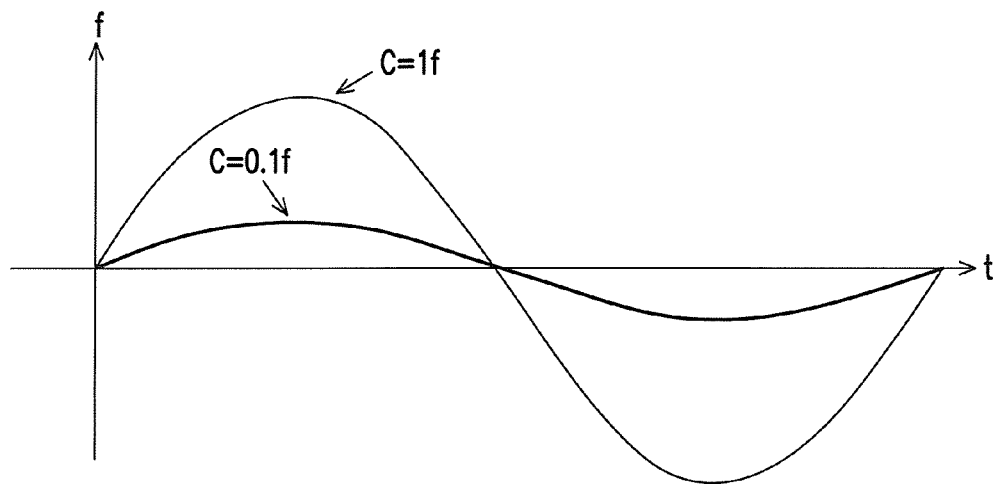
FIG. 2A is an oscillogram of the fingerprint identification signal according to an embodiment of the invention.
Figure 2B:
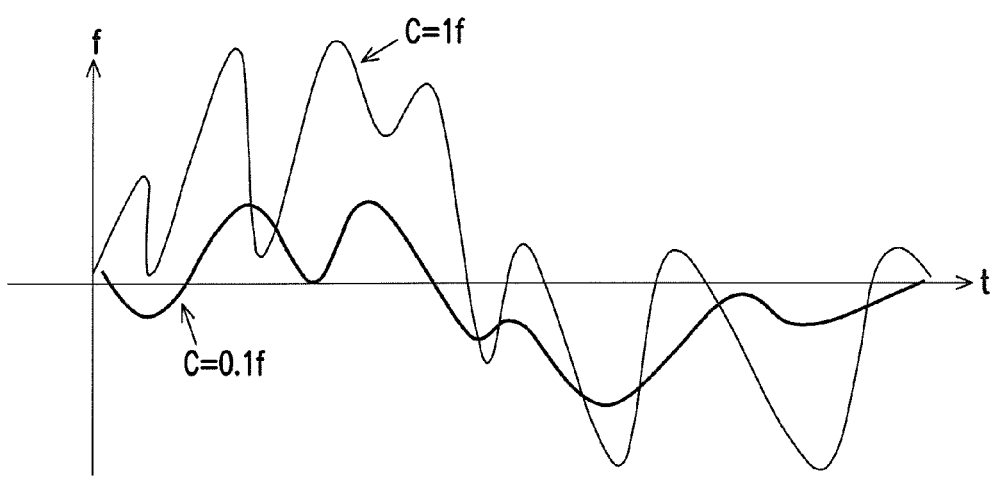
FIG. 2B is an oscillogram of the sensing signal according to an embodiment of the invention.

FIG. 2A is an oscillogram of the fingerprint identification signal according to an embodiment of the invention. FIG. 2B is an oscillogram of the sensing signal according to an embodiment of the invention.

Referring to FIGS. 1 and 2A, the oscillogram of the sensing signal SS in FIG. 2A represents the change in capacitance 1 f and 0.1 f in response to the ridge-valley change of the fingerprint, and the noise interference. In the present embodiment, the driving circuit 200 receives the sensing signal SS through the signal transmission path 120. The sensing signal SS includes the capacitance sensed by the sensors 110 and the noise generated by the parasitic capacitance or the capacitance provided by other switch elements in the signal transmission path 120. In the present embodiment, the changes in capacitance sensed by the sensor 110 in the sensing signal SS and the noise interference may mix together. Therefore, another signal transmission path 130 is arranged in the sensing panel 100, and configured to transmit the reference signal FS which has the noise the same as the signal transmission path 120. The reference signal FS does not include the changes in capacitance sensed by the sensor 110. Therefore, the driving circuit 200 may utilize the reference signal FS and the sensing signal SS to perform a differential operation to eliminate the noise waveform in the sensing signal SS.

Referring to FIGS. 1 and 2B, the oscillogram of the fingerprint identification signal FIS in FIG. 2B represents the change in capacitance 1 f and 0.1 f in response to the ridge-valley change of the fingerprint. In the present embodiment, the driving circuit 200 utilizes the differential signal of the sensing signal SS and the reference signal FS to perform the differential operation. This operation removes the noise waveform in the sensing signal SS through the reference signal FS which has the same noise waveform. Therefore, the driving circuit 200 acquires the fingerprint identification signal FIS in FIG. 2B, and in the present embodiment, the fingerprint identification signal FIS has a precise capacitance waveform change of the fingerprint pattern and provides the circuit (not illustrated in figure) next to the driving circuit 200 to execute the fingerprint identification operation.

Figure 3:
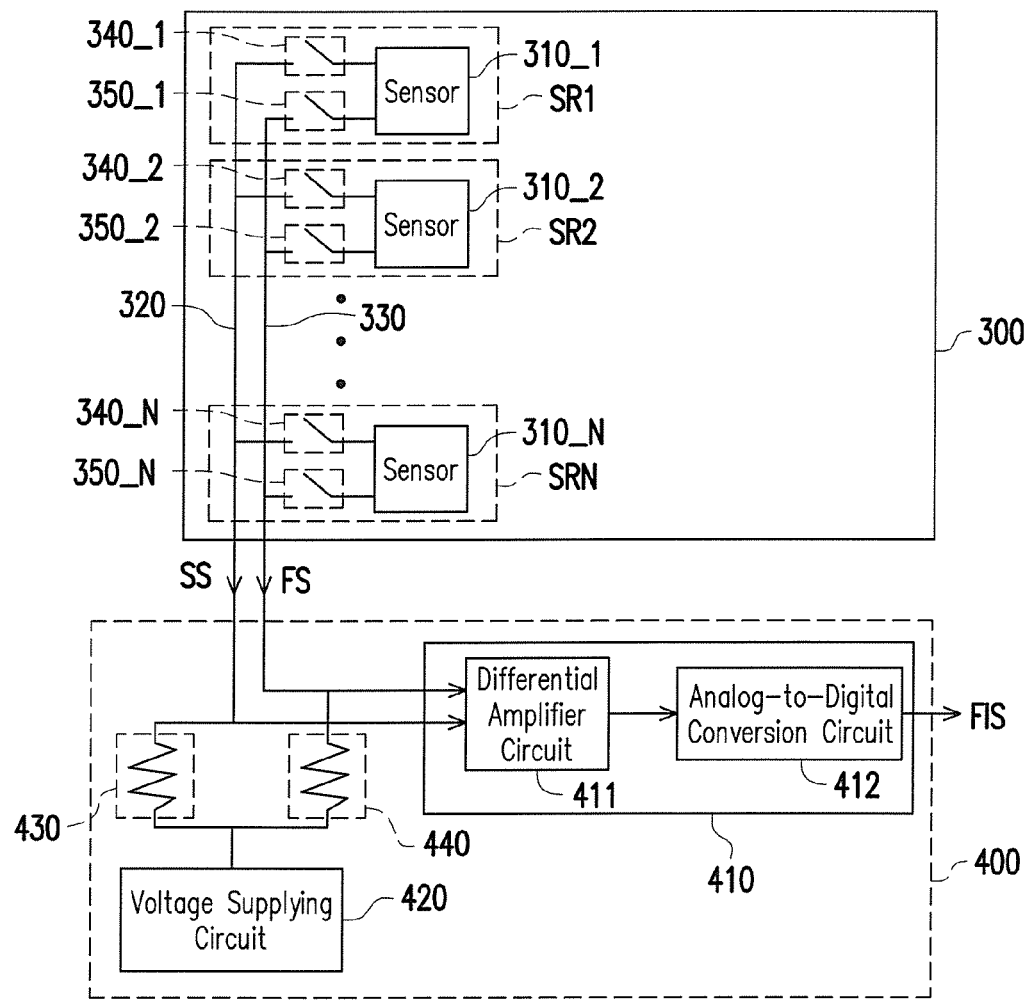
FIG. 3 is a schematic view of the fingerprint identification system according to another embodiment of the invention.

FIG. 3 is a schematic view of the fingerprint identification system according to another embodiment of the invention. Referring to FIG. 3, the fingerprint identification system 30 of the present embodiment includes a sensing panel 300 and a driving circuit 400. The sensing panel 300 includes a plurality of sensors 310_1 to 310_N. The sensors 310_1 to 310_N correspond to a plurality of sensing regions SR1 to SRN of the sensing panel 300 in a manner of one-to-one. The sensors 310_1 to 310_N are configured to respectively sense the capacitance of the sensing regions SR1 to SRN, where N is a positive integer larger than zero. Each of the sensors 310_1 to 310_N respectively transmits the sensing signal SS and the reference signal FS through two signal transmission paths 320 and 330.

In the present embodiment, the sensing panel 300 further includes a plurality of switch components and the two signal transmission paths 320 and 330. The sensors 310_1 to 310_N are respectively connected to the signal transmission paths 320 and 330 through the switch components 340_1 to 340_N and 350_1 to 350_N. The corresponding switch component respectively execute the same switch operation. The sensors 310_1 to 310_N determine whether to transmit the sensed capacitance through the switch components 340_1 to 340_N, respectively.

It should be noted that, in the present embodiment, the signal transmission path 330 is not substantially coupled to the sensors 310_1 to 310_N, and therefore the transmitted reference signal FS of the signal transmission path 330 does not include the capacitance of the sensing regions SR1 to SRN. In addition, the circuit configuration of the sensors 310_1 to 310_N and the area size of the sensing regions SR1 to SRN of the present embodiment are not limited as shown in FIG. 3. FIG. 3 only demonstrates a summary of schematic, and its purpose is to illustrate the coupling relationships between the sensing regions SR1 to SRN and the signal transmission paths 320 and 330. The signal transmission path 320 is coupled to the sensors 310_1 to 310_N to receive the changes in capacitance of the sensing regions SR1 to SRN by using the sensors 310_1 to 310_N. In contrast, the signal transmission path 330 is not coupled to the sensors 310_1 to 310_N. The signal transmission path 330 is configured to transmit the reference signal FS, and the reference signal FS corresponds to the noise waveform in the sensing signal SS.

In addition, the related circuit features, signal transmission means, signal processing method and fingerprint identification operations of the sensing panel 300 described in this embodiment of the invention is sufficiently taught, suggested, and embodied in the embodiments illustrated in FIG. 1 to FIG. 2B, and therefore no further description is provided herein.

In the present embodiment, the driving circuit 400 includes the signal processing circuit 410, the voltage supplying circuit 420 and the resistors 430 and 440. The signal processing circuit 410 includes the differential amplifier circuit 411. The differential amplifier circuit 411 is configured to receive the sensing signal SS and the reference signal FS through the signal transmission paths 320 and 330. The differential amplifier circuit 411 performs the differential operation to obtain the fingerprint identification signal FIS, and outputs the operation result of the fingerprint identification signal FIS to the circuit of next stage (not illustrated in figure) to execute the next phase of the fingerprint identification operation. However, in another embodiment, the driving circuit 400 may further include an analog-to-digital conversion circuit 412 to receive the fingerprint identification signal FIS for analog-to-digital conversion. The driving circuit 400 outputs the conversion result to the circuit of next stage (not illustrated in figure) to execute the next phase of the fingerprint identification operation, but the invention is not limited thereto.

In the present embodiment, the voltage supplying circuit 420 is coupled to the signal transmission paths 320 and 330 respectively through the two resistors 430 and 440 for providing the same bias voltage to drive the sensing panel 300 through the signal transmission paths 320 and 330. Specifically, since the signal transmission paths 320 and 330 are in a symmetric configuration and have the same equivalent load, the voltage supplying circuit 420 provides the same bias voltage to the signal transmission paths 320 and 330 through the two resistors 430 and 440. Accordingly, the signal transmission paths 320 and 330 generates the same noise or parasitic capacitance effect, so that the sensing signal SS and the reference signal FS form the differential signal pair.

Figure 4:
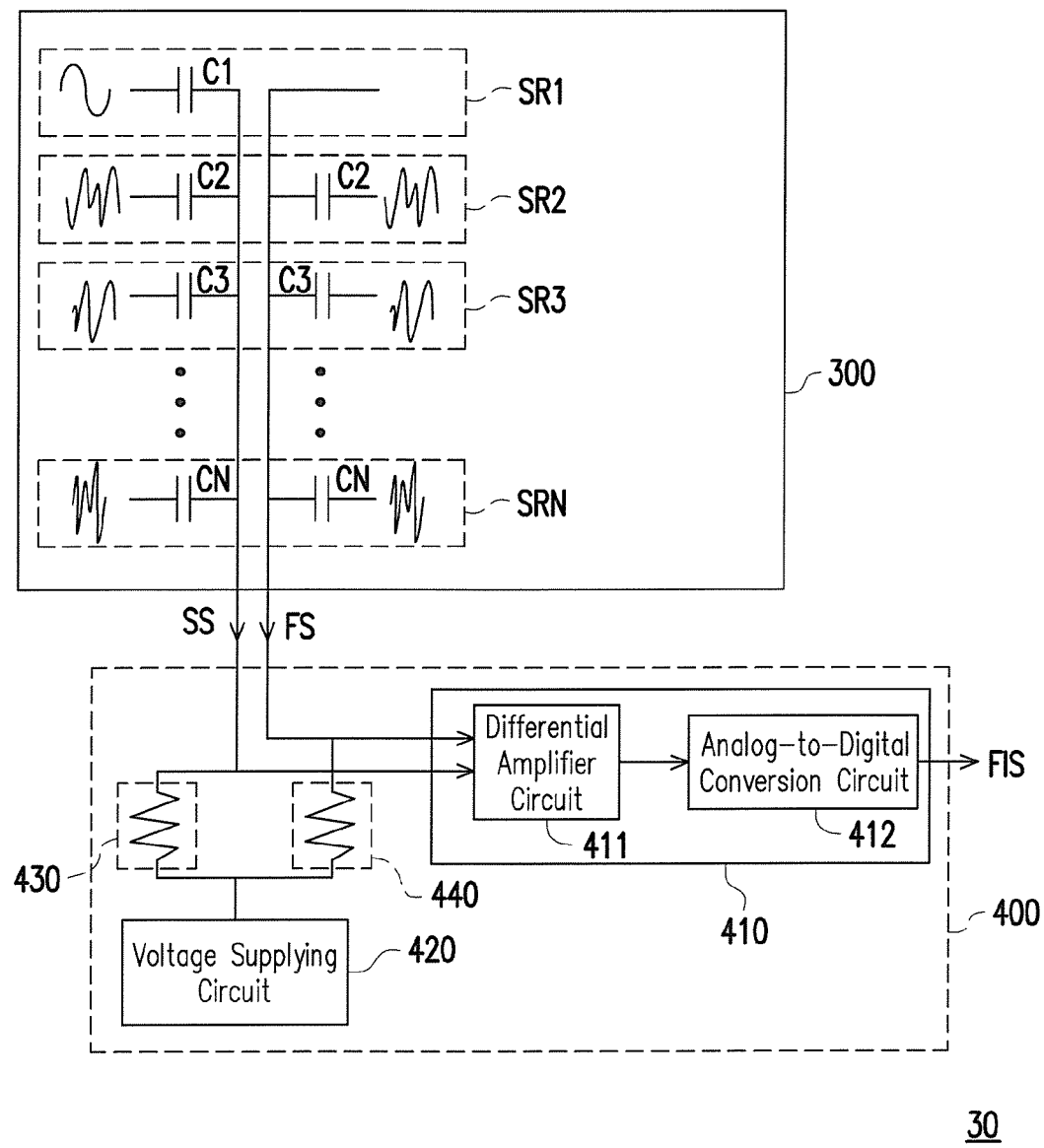
FIG. 4 is a schematic view of the signal of the fingerprint identification system according to the embodiment of FIG. 3.

For example, FIG. 4 is a schematic view of the signal of the fingerprint identification system according to the embodiment of FIG. 3. Referring to FIGS. 3 and 4, in the present embodiment, when the sensor 310_1 senses the changes in capacitance of the touch region SR1 of the touch panel 300 through the conducted switch component switch 340_1, the switch components 340_2 to 340_N are in a non-conducted state, and the corresponding switch components 350_1 to 350_N have the same switch operation. In other words, the sensor 310_1 transmits the sensed capacitance C1 to the driving circuit 400 through the signal transmission path 320. In contrast, the switch component 340_1 is also in the conducted state, but the signal transmission path 330 does not transmit the signal waveform including the change in capacitance C1 of the touch region SR1.

In the process of signal transmission, the signal transmission path 330 or the sensors 310_2 to 310_N, which do not execute detections, may have the noise generated by the parasitic capacitance or the capacitance C2 to CN of the switch components 340_2 to 340_N. Therefore, the signal waveform of the sensing signal SS received by the driving circuit 400 may include the changes in capacitance of the touch region SR1 and other noises. However, the signal transmission path 330 and the signal transmission path 320 are in a symmetric configuration, which may be configured to generate the same noise interference. Thus, the reference signal FS received by the driving circuit 400 may include the signal waveform the same as the noise of the signal transmission path 320.

That is to say, in the present embodiment, the driving circuit 400 may execute the differential operation according to the differential signal pair formed by the sensing signal SS and the reference signal FS, so as to eliminate the noise interference in the sensing signal SS. Therefore, the driving circuit 400 may output the fingerprint identification signal FIS to the circuit (not illustrated in figure) next to the driving circuit 400 to execute the next phase of the fingerprint identification operation. The fingerprint identification signal FIS has less noise interference, or even without the noise interference, compared to the sensing signal SS.

It should be noted that, FIG. 4 illustrates a schematic figure of the signal, and the capacitance C1 in FIG. 4 represents the capacitance sensed in the sensing region SR1 of the sensor 310_1, and the capacitance C2 to CN is only used to indicate the possibly existing equivalent capacitance on the signal transmission paths 320 and 330 and of the switch components 340_1 to 340_N and 350_1 to 350_N.

Figure 5:
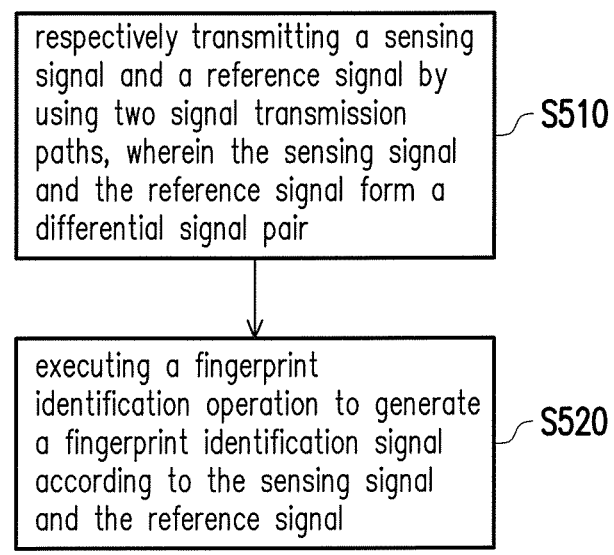
FIG. 5 is a flowchart of the fingerprint identification method according to an embodiment of the invention.

FIG. 5 is a flowchart of the fingerprint identification system according to an embodiment of the invention. Referring to FIGS. 1 and 5, the fingerprint identification method of the present embodiment is at least adapted for the fingerprint identification system 10 in FIG. 1, but the invention is not limited thereto. In the present embodiment, the fingerprint identification method at least includes the following steps. In step S510, the sensors 110 respectively transmit the sensing signal SS and the reference signal FS by using the two signal transmission paths 120 and 130. In step S510, the driving circuit 200 executes the fingerprint identification operation to generate the fingerprint identification signal FIS according to the sensing signal SS and the reference signal FS. The sensing signal SS and the reference signal FS form a differential signal pair.

In addition, the related circuit features, signal transmission means, signal processing method and fingerprint identification operations of the fingerprint identification system 10 described in this embodiment of the invention is sufficiently taught, suggested, and embodied in the embodiments illustrated in FIG. 1 to FIG. 4, and therefore no further description is provided herein.

In summary, in the embodiments of the invention, the fingerprint identification system respectively transmits the sensing signal and the reference signal by using two signal transmission paths arranged in the sensing panel. The two signal transmission paths of the fingerprint identification system have the same load and noise interference due to a symmetric configuration of two signal transmission paths, and thus, the sensing signal and the reference signal include the same noise. Through this, the driving circuit executes a differential operation by using the sensing signal and the reference signal forming the differential signal pair, so as to effectively eliminate the noise interference of the signal on signal transmission paths to further obtain the fingerprint identification signal.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A fingerprint identification system comprising:
    a sensing panel comprising a plurality of sensors, wherein each of the sensors transmits a sensing signal and a reference signal through two signal transmission paths; and
    a driving circuit coupled to the sensing panel, configured to drive the sensing panel, and execute a fingerprint identification operation according to the sensing signal and the reference signal, wherein the sensing signal and the reference signal form a differential signal pair, and the driving circuit generates a fingerprint identification signal according to the sensing signal and the reference signal,
    wherein the sensors are respectively connected to the two signal transmission paths via two switch components, and the two switch components are configured to execute an identical switching operation, wherein the sensors respectively correspond to a plurality of sensing regions of the sensing panel, and each of the sensors determines whether to transmit a capacitance of the corresponding sensing region via one of the two switch components.

2. The fingerprint identification system according to claim 1, wherein the two signal transmission paths are arranged in a symmetric configuration to have an equivalent load.

3. The fingerprint identification system according to claim 2, wherein the sensing signal is determined according to the capacitance and a parasitic capacitance of one of the two signal transmission paths.

4. The fingerprint identification system according to claim 3, wherein the reference signal is determined according to a parasitic capacitance of the other one of the two signal transmission paths.

5. The fingerprint identification system according to claim 1, wherein the driving circuit comprises:
    a signal processing circuit configured to receive the sensing signal and the reference signal, and perform a differential operation to obtain the fingerprint identification signal according to the sensing signal and the reference signal.

6. The fingerprint identification system according to claim 5, wherein the signal processing circuit comprises a differential amplifier circuit.

7. The fingerprint identification system according to claim 5, wherein the driving circuit further comprising:
    a voltage supplying circuit coupled to the two signal transmission paths through two resistors, and configured provides the same bias voltage to the two signal transmission paths to drive the sensing panel.

8. A driving circuit, adapted to drive a sensing panel, wherein the sensing panel comprises a plurality of sensors and two signal transmission paths, the driving circuit comprising:
    a signal processing circuit coupled to the sensing panel, configured to respectively receive a sensing signal and a reference signal through the two signal transmission paths, and execute a fingerprint identification operation according to the sensing signal and the reference signal, wherein the sensing signal and the reference signal form a differential signal pair, and the driving circuit generates a fingerprint identification signal according to the sensing signal and the reference signal,
    wherein the sensors are respectively connected to the two signal transmission paths via two switch components, and the two switch components are configured to execute an identical switching operation, wherein the sensors correspond to a plurality of sensing regions of the sensing panel, and each of the sensors determines whether to transmit a capacitance of the corresponding sensing region via one of the two switch components.

9. The driving circuit according to claim 8, wherein the two signal transmission paths are arranged in a symmetric configuration to have an equivalent load.

10. The driving circuit according to claim 9, wherein the sensing signal is determined according to the capacitance and a parasitic capacitance of one of the two signal transmission paths.

11. The driving circuit according to claim 10, wherein the reference signal is determined according to a parasitic capacitance of the other one of the two signal transmission paths.

12. The driving circuit according to claim 8, wherein the signal processing circuit comprises a differential amplifier circuit, configured to receive the sensing signal and the reference signal, and perform a differential operation to obtain fingerprint identification signal according to the sensing signal and the reference signal.

13. The driving circuit according to claim 8, wherein the driving circuit further comprises:
    a voltage supplying circuit coupled to the two signal transmission paths through two resistors, and configured provides the same bias voltage to the two signal transmission paths to drive the sensing panel.

14. A fingerprint identification method, adapted to a sensing panel, wherein the sensing panel comprises a plurality of sensors and two signal transmission paths, the fingerprint identification method comprising:
    respectively transmitting a sensing signal and a reference signal by using the two signal transmission paths; and
    executing a fingerprint identification operation according to the sensing signal and the reference signal to generate a fingerprint identification signal, wherein the sensing signal and the reference signal form a differential signal pair,
    wherein the sensors are respectively connected to the two signal transmission paths via two switch components, and the two switch components are configured to execute an identical switching operation, wherein the sensors respectively correspond to a plurality of sensing regions of the sensing panel, and each of the sensors determines whether to transmit a capacitance of the corresponding sensing region via one of the two switch components.

15. The fingerprint identification according to claim 14, wherein the sensing signal is determined according to the capacitance and a parasitic capacitance of one of the two signal transmission paths.

16. The fingerprint identification according to claim 15, wherein the reference signal is determined according to a parasitic capacitance of the other one of the two signal transmission paths.

17. The fingerprint identification according to claim 14, wherein the step of executing the fingerprint identification operation according to the sensing signal and the reference signal to generate the fingerprint identification signal comprises:

performing a differential operation to obtain the fingerprint identification signal according to the sensing signal and the reference signal.

\* \* \* \* \*